United States Patent
Zhao (10) Patent No.: US 11,936,482 B2
(45) Date of Patent: Mar. 19, 2024

(54) COMMUNICATING DIRECT HARQ FEEDBACK INFORMATION (71) Applicant: BEIJING XIAOMI MOBILE SOFTWARE CO., LTD., Beijing (CN)

(72) Inventor: Qun Zhao, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 409 days.

(21) Appl. No.: 17/418,751

(22) PCT Filed: Dec. 29, 2018

(86) PCT No.: PCT/CN2018/125826
§ 371 (c)(1),
(2) Date: Jun. 25, 2021

(87) PCT Pub. No.: WO2020/133505
PCT Pub. Date: Jul. 2, 2020

(65) Prior Publication Data
US 2022/0060285 A1    Feb. 24, 2022

(51) Int. Cl.
*H04L 1/1812* (2023.01)
*H04L 1/1607* (2023.01)
(Continued)

(52) U.S. Cl.
CPC .......... *H04L 1/1812* (2013.01); *H04L 1/1671* (2013.01); *H04L 1/1854* (2013.01);
(Continued)

(58) Field of Classification Search
CPC ........... H04L 1/1812; H04L 2001/0097; H04L 1/1671; H04L 1/1854; H04L 5/0055;
(Continued)

(56) References Cited

U.S. PATENT DOCUMENTS

2008/0209297 A1* 8/2008 Chandra ................ H04L 1/188
370/310
2013/0225184 A1   8/2013 Liu et al.
(Continued)

FOREIGN PATENT DOCUMENTS

| CN | 107733576 A | 2/2018 |
| CN | 109075921 A | 12/2018 |
| WO | WO 2017026970 A1 | 2/2017 |

OTHER PUBLICATIONS

European Patent Application No. 18944184.3, Search and Opinion dated Jun. 27, 2022, 8 pages.

(Continued)

*Primary Examiner* — Omar J Ghowrwal
(74) *Attorney, Agent, or Firm* — COZEN O'CONNOR (57) ABSTRACT

A data transmission method, and a device are provided. The method includes: when direct hybrid auto repeat request HARQ feedback information and uplink information are to be sent within a target time unit, and the direct HARQ feedback information and the uplink information satisfy a predetermined timing relationship, sending, by a first terminal, the direct HARQ feedback information and the uplink information to an access network device on the same physical layer uplink channel within the target time unit. The direct HARQ feedback information is configured to indicate a receiving state corresponding to direct data, and the direct data is physical layer data sent by the first terminal to a second terminal through a direct link.

17 Claims, 6 Drawing Sheets

(51) Int. Cl.
*H04L 1/1829* (2023.01)
*H04L 5/00* (2006.01)
*H04W 72/23* (2023.01)
*H04W 76/23* (2018.01)
*H04L 1/00* (2006.01)
*H04W 4/40* (2018.01)

(52) U.S. Cl.
CPC .......... *H04L 5/0055* (2013.01); *H04L 5/0057* (2013.01); *H04W 72/23* (2023.01); *H04W 76/23* (2018.02); *H04L 2001/0097* (2013.01); *H04W 4/40* (2018.02)

(58) Field of Classification Search
CPC ...... H04L 5/0057; H04W 72/23; H04W 4/40; H04W 76/23
See application file for complete search history.

(56) References Cited

U.S. PATENT DOCUMENTS

2015/0023267 A1    1/2015  Lim et al.
2020/0389262 A1*  12/2020  Oh ..................... H04W 52/146

OTHER PUBLICATIONS

PCT/CN2018/125826 English translation fo the International Search Report dated Aug. 27, 2019, 3 pages.
Indian Patent Application No. 202147031445, Office Action dated Mar. 8, 2022, 5 pages.

* cited by examiner

COMMUNICATING DIRECT HARQ FEEDBACK INFORMATION

CROSS REFERENCE TO RELATED APPLICATIONS

This application is a national phase application based on International Application No. PCT/CN2018/125826, filed Dec. 29, 2018, the content of which is incorporated herein by reference.

TECHNICAL FIELD

The present disclosure relates to a field of communication technologies, and more particularly, to a data transmission method for direct communication and a device.

BACKGROUND

In Vehicle to Everything (V2X) technologies, on-board devices and other devices (such as other vehicle-mounted devices, roadside infrastructure, etc.) may perform direct communication through sidelinks. The direct communication has characteristics of short delay and low overhead.

SUMMARY

The present disclosure provides a data transmission method for direct communication and a device.

According to a first aspect of embodiments of the present disclosure, a data transmission method for direct communication is provided, and includes:

when direct hybrid auto repeat request (HARQ) feedback information and uplink information are to be sent within a target time unit, and the direct HARQ feedback information and the uplink information satisfy a predetermined timing relationship, sending, by a first terminal, the direct HARQ feedback information and the uplink information to an access network device on the same physical layer uplink channel within the target time unit;

in which, the direct HARQ feedback information is configured to indicate a receiving state corresponding to direct data, and the direct data is physical layer data sent by the first terminal to a second terminal through a direct link.

According to a second aspect of embodiments of the present disclosure, a data transmission method for direct communication is provided, and includes:

when direct hybrid auto repeat request HARQ feedback information and uplink information sent by the first terminal are to be received within a target time unit, and the direct HARQ feedback information and the uplink information satisfy a predetermined timing relationship, receiving, by an access network device, the direct HARQ feedback information and the uplink information sent by the first terminal on the same physical layer uplink channel within the target time unit;

in which, the direct HARQ feedback information is configured to indicate a receiving state corresponding to direct data, and the direct data is physical layer data sent by the first terminal to a second terminal through a direct link.

According to a third aspect of embodiments of the present disclosure, a terminal is provided and includes:

a processor;
a transceiver coupled to the processor;
a memory configured to store instructions executable by the processor;

in which the processor is configured to load and execute the executable instructions to implement steps of a data transmission method for direct communication. The processor is configured to: when direct hybrid auto repeat request HARQ feedback information and uplink information are to be sent within a target time unit, and the direct HARQ feedback information and the uplink information satisfy a predetermined timing relationship, send, by a first terminal, the direct HARQ feedback information and the uplink information to an access network device on the same physical layer uplink channel within the target time unit. The direct HARQ feedback information is configured to indicate a receiving state corresponding to direct data, and the direct data is physical layer data sent by the first terminal to a second terminal through a direct link.

It should be noted that, the details above and in the following text are exemplary and illustrative, and do not constitute limitation on the present disclosure.

BRIEF DESCRIPTION OF THE DRAWINGS

The drawings herein are incorporated into the specification and constitute a part of the specification, show embodiments in conformity with embodiments of the present disclosure, and explain the principle of the present disclosure together with the specification.

DETAILED DESCRIPTION

The example embodiments will be described in detail here, and examples thereof are shown in the accompanying drawings. When the following descriptions refer to the accompanying drawings, unless otherwise indicated, the same numbers in different drawings represent the same or similar elements. The implementations described in the following example embodiments do not represent all the implementations consistent with the present invention. Rather, they are merely examples of the apparatus and method consistent with some aspects of the present invention as detailed in the appended claims.

Network architectures and service scenarios described in embodiments of the present disclosure are intended to more clearly illustrate technical solutions of the embodiments of the present disclosure, and do not constitute a limitation on the technical solutions provided by the embodiments of the present disclosure. Those ordinary skilled in the art will know that the technical solutions provided in the embodiments of the present disclosure are equally applicable to similar technical problems with evolutions of the network architectures and emergence of new service scenarios.

Figure 1:
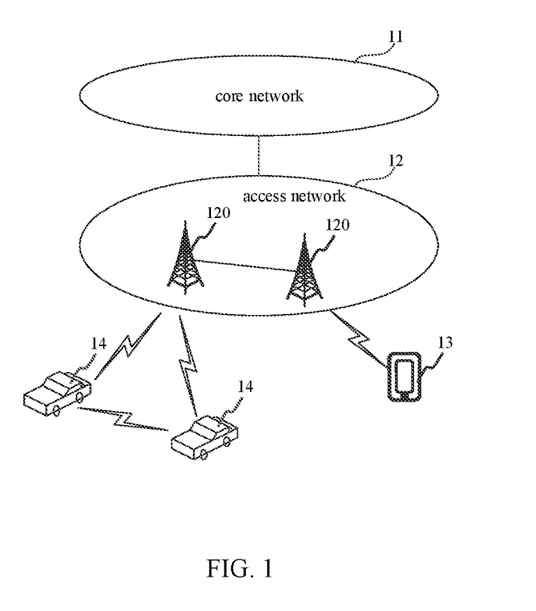
FIG. 1 is a schematic diagram of a network architecture possibly applicable for embodiments of the present disclosure.

FIG. 1 is a schematic diagram of a network architecture possibly applicable for embodiments of the present disclosure. The network architecture may be a network architecture of a C-V2X system. C refers to as cellular, and the C-V2X system is an on-board radio communication system formed based on evolutions of cellular network communication systems such as 3G, 4G, or 5G. The network architecture may include: a core network 11, an access network 12, a terminal 13, and a vehicle 14.

The core network 11 includes several core network devices. The function of the core network device is mainly to provide user connections, to manage users, and to complete bearers for services, as a bearer network to provide an interface to an external network. For example, the core network of a Long Term Evolution (LTE) system may include a Mobility Management Entity (MME), a Serving Gateway (S-GW), a PDN Gateway (P-GW), and other devices. The core network of a 5G NR system may include Access and Mobility Management Function (AMF) entities, User Plane Function (UPF) entities, and Session Management Function (SMF) entities, and other devices.

The access network 12 includes several access network devices 120. The access network device 120 and the core network device 110 communicate with each other through a certain interface technology, such as an S1 interface in the LTE system, and an NG interface in the 5G NR system. The access network device 120 may be a base station (BS), which is a device arranged in the access network and configured to provide a radio communication function for a terminal. The base station may include various forms of macro base stations, micro base stations, relay stations, access points, and so on. In systems using different radio access technologies, names of devices with base station function may be different. For example, in the LTE system, the device with the base station function is referred to as eNodeB or eNB; in 5G NR systems, the device with the base station function is referred to as gNodeB or gNB. The name "base station" may change with evolutions of communication technologies. For convenient of description, in the embodiments of the present disclosure, the above-mentioned devices that provide a radio communication function for terminals are collectively referred to as an access network device.

The terminal 13 may include various handheld devices, on-board devices, wearable devices, computing devices or other processing devices connected to radio modems, which are with the radio communication function, as well as various forms of User Equipment (UE), Mobile Stations (MS), terminal devices and so on. For convenient of description, the above-mentioned devices are collectively referred to as the terminal. The access network device 120 and the terminal 13 communicate with each other through a certain air interface technology, such as a Uu interface.

The vehicle 14 may be an automated driving vehicle, or may also be a non-automated driving vehicle. The vehicle 14 is provided with an on-board device, and implements communication with other vehicles, the terminal 13 or other devices, such as a road side unit (RSU), through the on-board device. The on-board device may also be referred to as an on-board terminal, an on-board communication device, or other names, which will not be limited in embodiments of the present disclosure. The on-board device may be a device integrated in a Telematics BOX (T-BOX), or may be a device separate from body of the vehicle. In addition, the on-board device may be installed in the vehicle 14 before the vehicle 14 leaves a factory, or may be installed in the vehicle 14 after the vehicle 14 leaves the factory.

The on-board device of the vehicle 14 may communicate with other devices (such as other on-board devices, terminal 13, RSU, etc.) each other through a direct communication interface (such as a PC5 interface). Accordingly, a communication link established based on the direct communication interface may be referred to as a direct link or a sidelink. In addition, the on-board device of the vehicle 14 and other devices may also be relayed through the access network 12 and the core network 11, that is, the communication link between the terminal 13 and the access network device 120 in an original cellular network is used for communication. Compared with the communication based on the Uu interface, the communication based on the direct communication interface has characteristics of short delay and low overhead, and is suitable for communication between on-board devices and other peripheral devices that have close geographical positions.

The above-mentioned network architecture illustrated in FIG. 1 may implement a V2X service scenario. The above-mentioned network architecture may also include devices such as a RSU, a V2X application server, and a V2X control function entity, which will not be limited in embodiments of the present disclosure. In addition, the technical solutions described in embodiments of the present disclosure may be applicable to the 5G NR system, and may also be applicable to a subsequent evolution system of the 5G NR system.

In embodiments of the present disclosure, for the direct communication scenario in the above-mentioned V2X service scenario, a data transmission method for direct communication is provided to solve a problem of resource conflicts.

In embodiments of the present disclosure, a first terminal and a second terminal are devices at both ends of the direct communication in the V2X service scenario. The sidelink may be established between the first terminal and the second terminal through a direct communication interface (such as a PC5 interface), and then interactions between user plane data and control plane signaling may be performed through the sidelink. For example, the first terminal may be the on-board device of the vehicle 14 in the network architecture illustrated in FIG. 1, and the second terminal may be the on-board device of other vehicles, or may also be the terminal 13 or the RSU or the like. For another example, the first terminal may be the terminal 13 in the network architecture illustrated in FIG. 1, and the second terminal may be other terminals, and may also be the on-board device of the vehicle 14 or the RSU or the like. In some embodiments, the same device (for example, the same on-board device or the same terminal) may serve as the first terminal in some scenarios, and may also serve as the second terminal in other scenarios.

In embodiments of the present disclosure, the first terminal is also referred to as user equipment at a sending end of the direct communication, and the second terminal is also referred to as the user equipment at a receiving end of the direct communication.

Hereinafter, the technical solution of the present disclosure will be introduced and explained through several exemplary embodiments.

Figure 2:
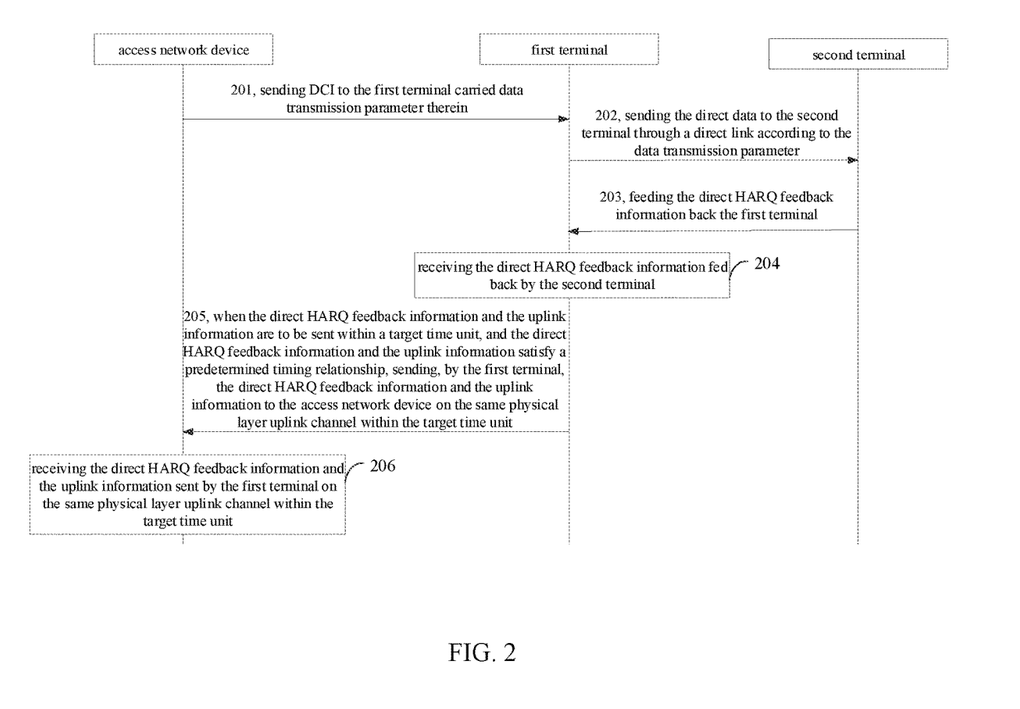
FIG. 2 is a flowchart illustrating a data transmission method for direct communication according to an exemplary embodiment.

FIG. 2 is a flowchart illustrating a data transmission method for direct communication according to an example embodiment. The method may be applied to the network architecture illustrated in FIG. 1 and may include the following blocks.

At block 201, an access network device sends DCI to the first terminal. The DCI carries data transmission parameter therein.

Optionally, the access network device sends the DCI to the first terminal through a downlink channel. The DCI is DCI configured for scheduling transmission of the direct data.

As an example, the downlink channel includes a Physical Downlink Control Channel (PDCCH).

Optionally, the data transmission parameter is configured to indicate a time-frequency resource and/or a modulation and coding scheme.

At block 202, the first terminal sends the direct data to the second terminal through a direct link according to the data transmission parameter.

Optionally, the first terminal receives the DCI sent by the access network device through the downlink channel, and sends the direct data to the second terminal, according to the time-frequency resource and/or the modulation and coding scheme indicated by the data transmission parameter in the DCI, through the direct link.

The direct data is physical layer data sent by the first terminal to the second terminal through the direct link.

The first terminal sends the direct data to the second terminal by a target time-frequency resource of the direct link.

Optionally, the target time-frequency resource is a pre-defined or pre-configured time-frequency resource.

Optionally, the first terminal may also send control information to the second terminal before or at the same time when the direct data is sent, and the control information is configured to indicate receipt related information of physical layer data.

Optionally, the receipt related information includes: a time domain position and/or a frequency domain position of the target time-frequency resource configured to bear the physical layer data. In some embodiments, the receipt related information further includes a Modulation and Coding Scheme (MCS) of the physical layer data, a Hybrid ARQ Process Number (HARQ-ID), and a New-Data Indicator (NDI) and other information.

At block 203, the second terminal feeds the direct HARQ feedback information back the first terminal.

Accordingly, the second terminal receives the direct data sent by the first terminal. Optionally, the second terminal receives the direct data sent by the first terminal using the target time-frequency resource of the direct link.

The second terminal feeds back the direct HARQ feedback information to the first terminal, and the direct HARQ feedback information includes HARQ feedback bits corresponding to at least once direct data transmission.

For example, the number of the HARQ feedback bits corresponding to once direct data transmission is 1 bit or 2 bits.

The direct HARQ feedback information is configured to indicate a receiving state corresponding to the direct data. The receiving state corresponding to the direct data includes an Acknowledgement state (ACK) or a Non-Acknowledgement state (NACK).

ACK is configured to indicate that the direct data is correctly received by the second terminal.

NACK includes an unreceived state and/or an incorrectly received state. The unreceived state is configured to indicate that the direct data is not received by the second terminal; the incorrectly received state is configured to indicate that although the direct data is received by the second terminal, but the direct data received by the second terminal is different from the direct data sent by the first terminal, that is, incorrect direct data is received.

After receiving the direct data, the second terminal processes the received direct data. For example, the second terminal performs processing such as demodulation or decoding on the direct data. During the processing, the second terminal will determine the receiving state of the direct data.

Optionally, the second terminal sends the direct HARQ feedback information to the first terminal through a direct channel. For example, the direct channel is a Physical Sidelink Feedback Channel (PSFCH).

At block 204, the first terminal receives the direct HARQ feedback information fed back by the second terminal.

Accordingly, the first terminal receives the direct HARQ feedback information sent by the second terminal through the direct feedback channel such as PSFCH.

It should be noted that the direct communication scheme between the first terminal and the second terminal in the embodiment of the present disclosure is a direct communication scheme based on scheduling of the access network device. That is, the first terminal sends data based on the scheduling of the access network device. For the direct communication scheme based on the scheduling of the access network scheduling, since the scheduling is done by the access network device side, the direct HARQ feedback information corresponding to the direct data is to be transmitted from the second terminal back to the access network device to facilitate the network device side scheduling data retransmission or new data sending. Considering that the first terminal may be in an overlaying range of the access network device which is different from the overlaying range of the access network device of the second terminal, or outside the network overlay, the direct HARQ feedback information is to be transmitted from the second terminal to the first terminal first, and then reports to the access network device by the first terminal.

At block 205, when the direct HARQ feedback information and the uplink information are to be sent within a target time unit, and the direct HARQ feedback information and the uplink information satisfy a predetermined timing relationship, a first terminal sends the direct HARQ feedback information and the uplink information to the access network device on the same physical layer uplink channel within the target time unit.

It should be noted that the first terminal receives the direct HARQ feedback information sent by the second terminal, and before the first terminal reports the direct HARQ feedback information to the access network device, the first terminal requires to process the direct HARQ feedback information. A processing procedure of the first terminal will take some time. When the direct HARQ feedback information and the uplink information are to be sent within the target time unit, in response to some uplink information having been transmitted in a process of the first terminal processing the direct HARQ feedback or being transmitted to the access network device, the first terminal cannot multiplex the uplink information with the direct HARQ feedback to report together, or the first terminal requires to exit the existing transmission process to perform multiplexing again, which will greatly increase complexity of chips. Therefore, when the direct HARQ feedback information and the uplink information are to be sent within the target time unit, the direct HARQ feedback information and the uplink information at least satisfy the predetermined timing relationship to ensure that the first terminal is capable of processing the uplink multiplex transmission timely.

The direct HARQ feedback information is configured to indicate the receiving state corresponding to the direct data, and the direct data is physical layer data sent by the first terminal to the second terminal through the direct link.

Optionally, the uplink information includes Uplink Control Information (UCI) and/or uplink service data sent by the first terminal to the access network device.

The UCI includes at least one of the following information:
Scheduling Request (SR);
Feedback response information: Acknowledgement (ACK) or Non-Acknowledgement (NACK);
Channel State Information (CSI);
Channel Quality Indicator (CQI).

The predetermined timing relationship is a pre-configured or predefined timing relationship between the direct HARQ feedback information and the uplink information.

Optionally, the target time unit refers to as a corresponding time unit when the terminal device requires to send uplink HARQ feedback bits and the direct HARQ feedback information. For example, the target time unit is a symbols, b symbol groups, c slots or d subframes, a, b, c, d are positive integers, which are not limited in this embodiment.

Optionally, the first terminal receives configuration information sent by the access network device, and determines a physical resource of the same physical layer uplink channel within the target time unit according to the configuration information.

Optionally, the physical layer uplink channel is an uplink channel configured to send the uplink HARQ feedback bits to the access network device.

Optionally, the physical layer uplink channel is an uplink channel based on a first communication protocol or a second communication protocol. The first communication protocol includes a LTE protocol, and the second communication protocol includes a NR protocol.

Optionally, the physical layer uplink channel is PUCCH. For example, a channel format of the PUCCH is any one of PUCCH format 1, PUCCH format 1a, PUCCH format 1b, PUCCH format 2, PUCCH format 2a, PUCCH format 2b, PUCCH format 3, PUCCH format 4, and PUCCH format 5.

The first terminal sends the direct HARQ feedback information and the uplink information to the access network device in the physical resource of the same physical layer uplink channel within the target time unit.

At block 206, the access network device receives the direct HARQ feedback information and the uplink information sent by the first terminal on the same physical layer uplink channel within the target time unit.

Accordingly, when the direct HARQ feedback information and the uplink information are to be sent within the target time unit, and the direct HARQ feedback information and the uplink information satisfy the predetermined timing relationship, the access network device receives the direct HARQ feedback information and the uplink information sent by the first terminal on the same PUCCH within the target time unit.

It should be noted that in the embodiment of the present disclosure, the access network device requires to perform the same timing determination as the first terminal, that is, to determine whether the direct HARQ feedback information and the uplink information satisfy the predetermined timing relationship. The timing determination process of the access network device may be analogously referred to related details of the timing determination process of the first terminal, which will not be repeated here.

In summary, in this embodiment, when the direct HARQ feedback information and uplink information are to be sent within the target time unit, the direct HARQ feedback information and the uplink information at least satisfy the predetermined timing relationship to ensure that the first terminal is capable of processing uplink multiplexing transmission timely, that is, the first terminal may use the same physical layer uplink channel within the target time unit to report. Therefore, the problem of resource conflicts caused by overlap of the direct HARQ feedback and other uplink data transmission in time domain in the related technologies, a success rate of information receiving and sending in a direct communication scenario is fully guaranteed, and it is beneficial to improve efficiency of data transmission.

Optionally, performing uplink multiplexing transmission of the direct HARQ feedback information and the uplink information at least satisfies the predetermined timing relationship. The predetermined timing relationship includes a first time point being prior to a second time point, and an absolute value of a difference between the first time point and the second time point being greater than a predetermined processing time length.

The first time point is an end transmission time point of the direct HARQ feedback information on a PSFCH, and the second time point is a start transmission time point of the uplink information on the physical layer uplink channel.

Optionally, the first time point is an end time point of the direct HARQ feedback information transmitting on the PSFCH, that is, the time point when the first terminal receives the direct HARQ feedback information sent by the second terminal.

Optionally, the second time point is the start time point of the uplink information transmitting on the physical layer uplink channel, that is, the time point when the first terminal starts to send the uplink information to the access network device.

Optionally, the predetermined processing time length includes:
a first fixed constant; or
a time length predefined by a communication protocol; or
a time length pre-configured by the access network device.

For example, the predetermined processing time length is a fixed time length predefined by the communication protocol, for example, the predetermined processing time length is a length of one Orthogonal Frequency Division Multiplexing (OFDM) time domain symbol, or the predetermined processing time length is a length of one OFDM time domain symbol in a condition of having 15 KHz sub-carrier wave spacing.

Figure 3:
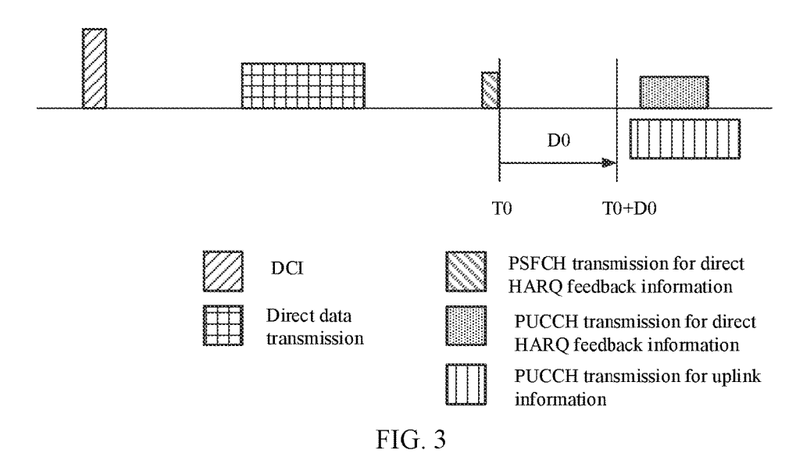
FIG. 3 is a schematic diagram illustrating a data transmission situation involved in a data transmission method for direct communication according to another exemplary embodiment.

In an illustrative example, as illustrated in FIG. 3, the first terminal receives the DCI sent by the access network device and configured for scheduling transmission of the direct data, and performs direct data transmission to the second terminal according to the data transmission parameter in the DCI. The first terminal receives the direct HARQ feedback information transmitted by the second terminal through the PSFCH. The first terminal determines that the first time point is T0 and the predetermined processing time length is D0. When the first terminal requires to send the direct HARQ feedback information and the uplink information whose start transmission time is after T0+D0 both within the target time unit, the first terminal sends the direct HARQ feedback information and the uplink information to the access network device on the same physical layer uplink channel within the target time unit.

Optionally, the block 205 includes the following blocks. The first terminal determines the first time point, and when the direct HARQ feedback information and the uplink information are to be sent within the target time unit, and the first time point is prior to the start transmission time point of the uplink information and an absolute value of a difference between the end transmission time point and the start transmission time point is greater than the predetermined processing time length, the first terminal sends the direct HARQ feedback information and the uplink information to the access network device on the same physical layer uplink channel within the target time unit.

Methods for the first terminal determining the first time point include but are not limited to the following possible implementations.

Figure 4:
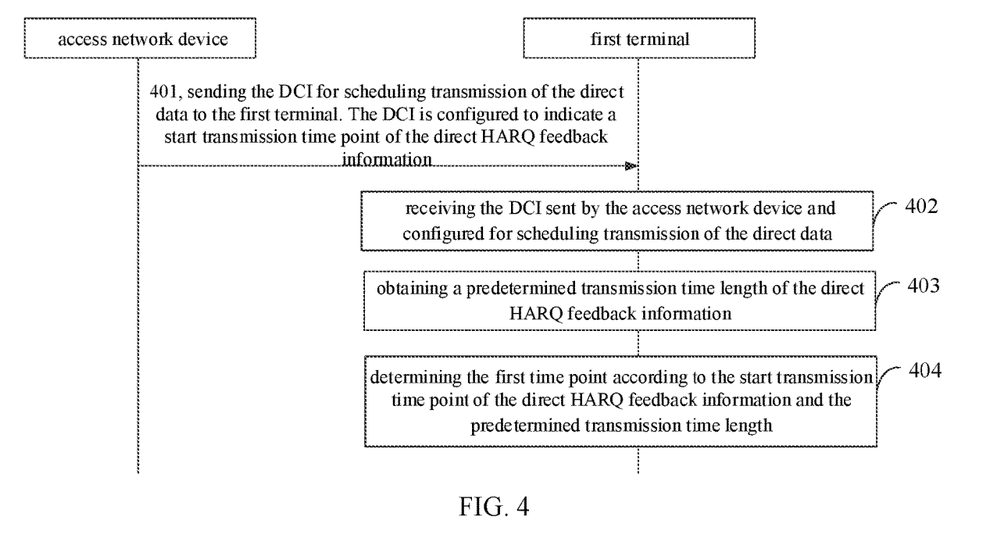
FIG. 4 is a flowchart illustrating a data transmission method for direct communication according to another exemplary embodiment.

In a possible implementation, as illustrated in FIG. 4, the method includes but are not limited to the following blocks.

At block 401, the access network device sends the DCI for scheduling transmission of the direct data to the first terminal. The DCI is configured to indicate a start transmission time point of the direct HARQ feedback information.

The start transmission time point of the direct HARQ feedback information is a time point when the second terminal starts to send the direct HARQ feedback information to the first terminal.

Optionally, the start transmission time point of the direct HARQ feedback information is a start time point when the direct HARQ feedback information transmits on the PSFCH.

At block 402, the first terminal receives the DCI sent by the access network device and configured for scheduling transmission of the direct data.

Optionally, the first terminal receives the DCI sent by the access network device. The DCI is configured to indicate the start transmission time point of the direct HARQ feedback information.

At block 403, the first terminal obtains a predetermined transmission time length of the direct HARQ feedback information.

The first terminal obtains the predetermined transmission time length of the direct HARQ feedback information.

Optionally, the predetermined transmission time length is a predefined or preconfigured time length of the direct HARQ feedback information transmitting on the PSFCH.

At block 404, the first terminal determines the first time point according to the start transmission time point of the direct HARQ feedback information and the predetermined transmission time length.

Optionally, the first terminal determines the first time point by adding the start transmission time point of the direct HARQ feedback information and the predetermined transmission time length. The first time point is the end transmission time point of the direct HARQ feedback information on the PSFCH.

The access network device requires to make the same timing determination as the first terminal, that is, the access network device sends the DCI for scheduling transmission of the direct data to the first terminal, and the DCI is configured to indicate the start transmission time point of the direct HARQ feedback information. And then the access network device obtains the predetermined transmission time length of the direct HARQ feedback information, and determines the first time point according to the start transmission time point of the direct HARQ feedback information and the predetermined transmission time length.

It should be noted that the process of determining the first time by the access network device according to the start time point of the direct HARQ feedback information and the predetermined transmission time length may analogously refer to the process of determining the first time by the first terminal, which will not repeat again.

Figure 5:
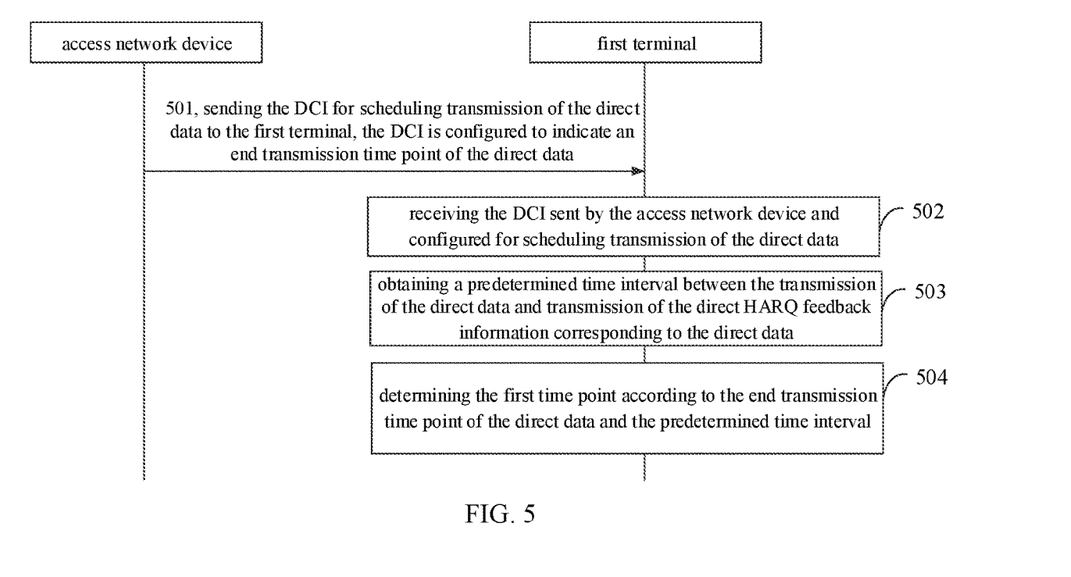
FIG. 5 is a flowchart illustrating a data transmission method for direct communication according to another exemplary embodiment.

In another possible implementation, as illustrated in FIG. 5, the method includes but are not limited to the following blocks.

At block 501, the access network device sends the DCI for scheduling transmission of the direct data to the first terminal. The DCI is configured to indicate an end transmission time point of the direct data. The end transmission time point of the direct data is a time point when the second terminal receives the direct data sent by the first terminal.

Optionally, the end transmission time point of the direct data is an end time point of the direct data transmitting on the direct channel.

At block 502, the first terminal receives the DCI sent by the access network device and configured for scheduling transmission of the direct data.

The first terminal receives the DCI sent by the access network device and configured for scheduling transmission of the direct data, and determines the end transmission time point of the direct data according to the DCI.

At block 503, the first terminal obtains a predetermined time interval between the transmission of the direct data and transmission of the direct HARQ feedback information corresponding to the direct data.

Optionally, the predetermined time interval is the time interval between the end transmission time point of the direct data and the start transmission time point of the corresponding direct HARQ feedback information.

The predetermined time interval may be determined in a static or semi-static manner such as a protocol definition or access network device configuration, or may be independently determined by the first terminal or the second terminal and reported to the access network device.

Optional, the predetermined time interval includes:
a second fixed constant; or
a time interval predefined by a communication protocol; or
a time interval pre-configured by the access network device.

Optional, the predetermined time interval includes:
a maximum time interval between the transmission of direct data reported by the first terminal and the transmission of the direct HARQ feedback information corresponding to the direct data.

When the predetermined time interval is the maximum time interval between the transmission of direct data reported by the first terminal and the transmission of the direct HARQ feedback information corresponding to the direct data, the timing for the terminal reporting the predetermined time interval includes, but is not limited to, the following two possible implementations.

In a possible implementation, the first terminal by itself reports the predetermined time interval to the access network device. That is, the first terminal reports the predetermined time interval to the access network device.

The predetermined time interval is the predetermined time interval between the transmission of the direct data and the transmission of the direct HARQ feedback information corresponding to the direct data.

In another possible implementation manner, the first terminal receives downlink signaling sent by the access network device, and the downlink signaling is configured to instruct the predetermined time interval fed back by the first terminal to the access network device. The first terminal feeds the predetermined time interval back the access network device according to the downlink signaling, and accordingly, the access network device receives the predetermined time interval.

At block 504, the first terminal determines the first time point according to the end transmission time point of the direct data and the predetermined time interval.

Optional, the first time point is the end transmission time point of the direct HARQ feedback information on the PSFCH.

Optional, the first terminal determines the first time point by adding the end transmission time point of the direct data and the predetermined time interval.

The access network device requires to make the same timing determination as the first terminal, that is, the access network device sends the DCI for scheduling transmission of the direct data to the first terminal, and the DCI is configured to indicate the end transmission time point of the direct data. And then the access network device obtains the predetermined time interval between the transmission of the direct data and transmission of the direct HARQ feedback information corresponding to the direct data, and determines the first time point according to the end transmission time point of the direct data and the predetermined time interval.

It should be noted that the process of determining the first time by the access network device according to the end time point of the direct data and the predetermined time interval may analogously refer to the process of determining the first time by the first terminal according to the end time point of the direct data and the predetermined time interval, which will not repeat again.

Figure 6:
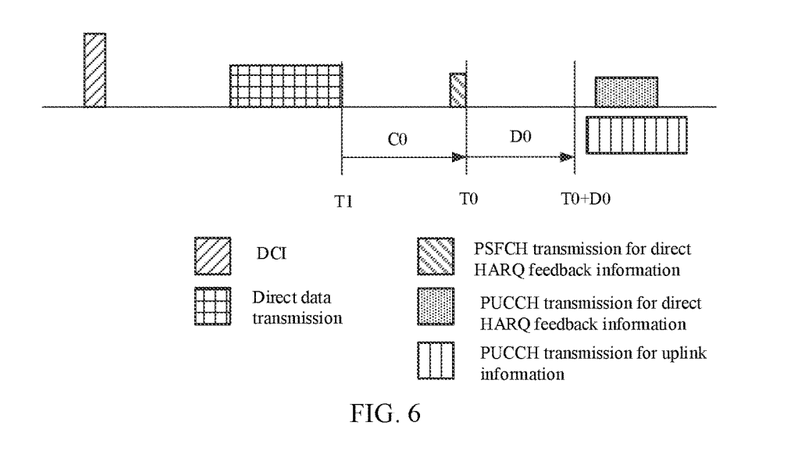
FIG. 6 is a schematic diagram illustrating a data transmission situation involved in a data transmission method for direct communication according to another exemplary embodiment.

In an illustrative example, as illustrated in FIG. 6, the first terminal receives the DCI sent by the access network device and for scheduling transmission of the direct data. The DCI is configured to indicate the end transmission time point T1 of the direct data. The first terminal performs direct data transmission to the second terminal according to the scheduling of the access network device, and receives the direct HARQ feedback information transmitted by the second terminal through the PSFCH. The first terminal obtains the predetermined time interval C0 predefined by the communication protocol, and determines the first time point T0 according to the addition of the end transmission time T1 of the direct data and the predetermined time interval C0. After determining that the first time point is T0="T1+C0" and the predetermined processing time length is D0, the first terminal executes that when requiring to send the direct HARQ feedback information and the uplink information whose start transmission time point is after T0+D0 both within the target time unit, the first terminal sends the direct HARQ feedback information and the uplink information to the access network device on the same physical layer uplink channel within the target time unit.

Figure 7:
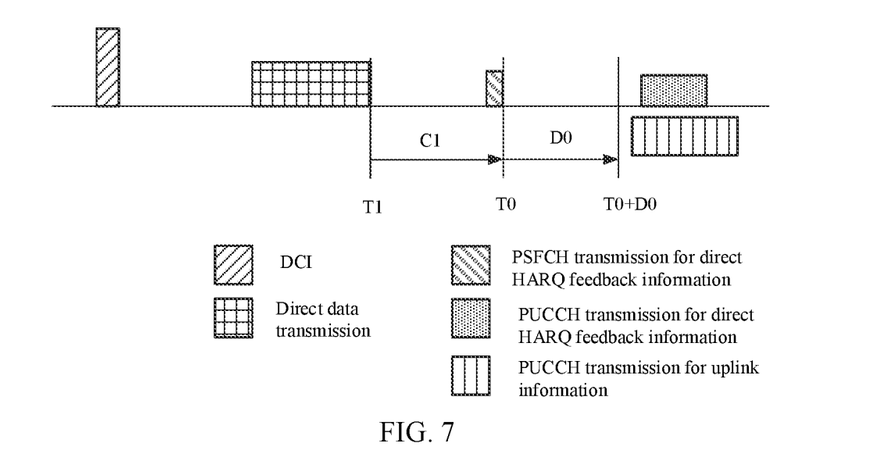
FIG. 7 is a schematic diagram illustrating a data transmission situation involved in a data transmission method for direct communication according to another exemplary embodiment.

In another illustrative example, as illustrated in FIG. 7, the first terminal receives the DCI sent by the access network device and for scheduling transmission of the direct data. The DCI is configured to indicate the end transmission time point T1 of the direct data. The first terminal performs the direct data transmission to the second terminal according to the scheduling of the access network device, and receives the direct HARQ feedback information transmitted by the second terminal through the PSFCH. The first terminal obtains the predetermined time interval C1 determined by itself, and determines the first time point T0 according to the addition of the end transmission time T1 of the direct data and the predetermined time interval C1. After determining that the first time point is T0="T1+C1" and the predetermined processing time length is D0, the first terminal executes that when requiring to send the direct HARQ feedback information and the uplink information whose start transmission time point is after T0+D0 both within the target time unit, the first terminal sends the direct HARQ feedback information and the uplink information to the access network device on the same physical layer uplink channel within the target time unit.

In summary, in the embodiment of the present disclosure, the first terminal determines the first time point, and when the direct HARQ feedback information and the uplink information are to be sent within the target time unit, the first time point is prior to the start transmission time point of the uplink information and an absolute value of a difference between the end transmission time point and the start transmission time point is greater than the predetermined processing time length, the first terminal sends the direct HARQ feedback information and the uplink information to the access network device on the same physical layer uplink channel within the target time unit. Therefore, a situation that when some uplink information starts to be transmitted on the uplink channel, the direct HARQ feedback information is generated and causes the first terminal to be unable to multiplex or exit the existing transmission process to perform multiplex again is avoided, which simplifies the complexity of the chips, and further ensures that the first terminal may process the uplink multiplexing transmission timely.

The below are apparatus embodiments of the present disclosure, which may be configured to execute method embodiments of the present disclosure. For details that are not disclosed in the apparatus embodiments of the present disclosure, please refer to the method embodiments of the present disclosure.

Figure 8:
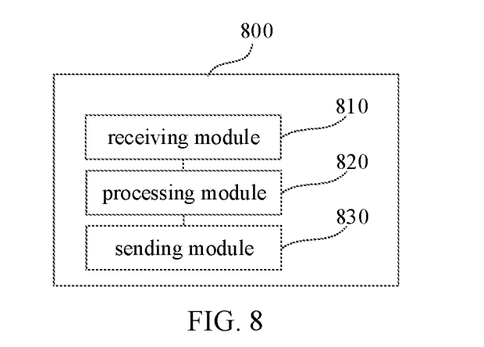
FIG. 8 is a block diagram illustrating a data transmission apparatus for direct communication according to an exemplary embodiment.

FIG. 8 is a block diagram illustrating a data transmission apparatus for direct communication according to an exemplary embodiment. The apparatus has a function of implementing the above-mentioned examples of the methods for the first terminal side, and the function may be realized by a hardware, or by executing a software by the hardware. The apparatus 800 may include a receiving module 810, a progressing module 820 and a sending module 830.

The sending module 830 is configured to when direct HARQ feedback information and uplink information are to be sent within a target time unit, and the direct HARQ feedback information and the uplink information satisfy a predetermined timing relationship, send the direct HARQ feedback information and the uplink information to an access network device on the same physical layer uplink channel within the target time unit.

The direct HARQ feedback information is configured to indicate a receiving state corresponding to direct data, and the direct data is physical layer data sent by the first terminal to a second terminal through a direct link.

Optionally, the uplink information includes at least one of scheduling request SR, feedback response information ACK/NACK, channel state information CSI, channel quality indicator CQI, and uplink service data.

Optionally, the predetermined timing relationship includes:

a first time point being prior to a second time point, and an absolute value of a difference between the first time point and the second time point being greater than a predetermined processing time length.

The first time point is an end transmission time point of the direct HARQ feedback information on a direct feedback channel PSFCH, and the second time point is a start transmission time point of the uplink information on the physical layer uplink channel.

Optionally, the predetermined processing time length includes:

a first fixed constant; or a time length predefined by a communication protocol; or a time length pre-configured by the access network device.

Optionally, the receiving module 810 is configured to receive DCI sent by the access network device and configured for scheduling transmission of the direct data. The DCI is configured to indicate a start transmission time point of the direct HARQ feedback information, and the start transmission time point of the direct HARQ feedback information is a time point when the second terminal starts to send the direct HARQ feedback information to the first terminal; and The progressing module 820 is configured to obtain a predetermined transmission time length of the direct HARQ feedback information, and determine the first time point according to the start transmission time point of the direct HARQ feedback information and the predetermined transmission time length.

Optionally, the receiving module 810 is configured to receive DCI sent by the access network device and configured for scheduling transmission of the direct data. The DCI is configured to indicate an end transmission time point of the direct data, and the end transmission time point of the direct data is a time point when the second terminal receives the direct data sent by the first terminal.

The progressing module 820 is configured to obtain a predetermined time interval between the transmission of the direct data and transmission of the direct HARQ feedback information corresponding to the direct data, and determine the first time point according to the end transmission time point of the direct data and the predetermined time interval.

Optionally, the predetermined time interval includes:

a second fixed constant; or a time interval predefined by a communication protocol; or a time interval pre-configured by the access network device.

Optionally, the predetermined time interval includes:

a maximum time interval between the transmission of direct data reported by the first terminal and the transmission of the direct HARQ feedback information corresponding to the direct data.

Optionally, the sending module 830 is further configured to report the predetermined time interval to the access network device; or, the receiving module 810 is further configured to receive downlink signaling sent by the access network device, and the sending module 830 is further configured to feed the predetermined time interval back the access network device according to the downlink signaling.

In summary, in embodiments of the present disclosure, when the direct HARQ feedback information and uplink information are to be sent within the target time unit, the direct HARQ feedback information and the uplink information at least satisfy the predetermined timing relationship to ensure that the first terminal is capable of processing uplink multiplexing transmission timely, that is, the first terminal may use the same physical layer uplink channel within the target time unit to report. Therefore, the problem of resource conflicts caused by overlap of the direct HARQ feedback and other uplink data transmission in time domain in the related technologies, a success rate of information receiving and sending in a direct communication scenario is fully guaranteed, and it is beneficial to improve efficiency of data transmission.

Figure 9:
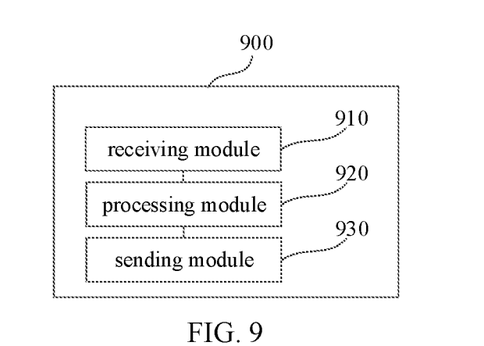
FIG. 9 is a block diagram illustrating a data transmission apparatus for direct communication according to another exemplary embodiment.

FIG. 9 is a block diagram illustrating a data transmission apparatus for direct communication according to another exemplary embodiment. The apparatus has a function of implementing the above-mentioned examples of the methods for the access network device side, and the function may be realized by a hardware, or by executing a software by the hardware. The apparatus 900 may include a receiving module 910, a progressing module 920 and a sending module 930.

The receiving module 910 is configured to when direct HARQ feedback information and uplink information sent by the first terminal are to be received within a target time unit, and the direct HARQ feedback information and the uplink information satisfy a predetermined timing relationship, receive the direct HARQ feedback information and the uplink information sent by the first terminal on the same physical layer uplink channel within the target time unit.

The direct HARQ feedback information is configured to indicate a receiving state corresponding to direct data, and the direct data is physical layer data sent by the first terminal to a second terminal through a direct link.

Optionally, the uplink information includes at least one of scheduling request SR, feedback response information ACK/NACK, channel state information CSI, channel quality indicator CQI, and uplink service data.

Optionally, the predetermined timing relationship includes:

a first time point being prior to a second time point, and an absolute value of a difference between the first time point and the second time point being greater than a predetermined processing time length.

The first time point is an end transmission time point of the direct HARQ feedback information on a direct feedback channel PSFCH, and the second time point is a start transmission time point of the uplink information on the physical layer uplink channel.

Optionally, the predetermined processing time length includes:

a first fixed constant; or a time length predefined by a communication protocol; or a time length pre-configured by the access network device.

Optionally, the sending module 930 is configured to send downlink control information DCI for scheduling transmission of the direct data to the first terminal. The DCI is configured to indicate a start transmission time point of the direct HARQ feedback information, and the start transmission time point of the direct HARQ feedback information is a time point when the second terminal starts to send the direct HARQ feedback information to the first terminal.

The progressing module 920 is configured to obtain a predetermined transmission time length of the direct HARQ feedback information, and determine the first time point according to the start transmission time point of the direct HARQ feedback information and the predetermined transmission time length.

Optionally, the sending module 930 is configured to send downlink control information DCI for scheduling transmission of the direct data to the first terminal. The DCI is configured to indicate an end transmission time point of the direct data, and the end transmission time point of the direct data is a time point when the second terminal receives the direct data sent by the first terminal.

The progressing module 920 is configured to obtain a predetermined time interval between the transmission of the direct data and transmission of the direct HARQ feedback information corresponding to the direct data, and determine the first time point according to the end transmission time point of the direct data and the predetermined time interval.

Optionally, the predetermined time interval includes:

a second fixed constant; or a time interval predefined by a communication protocol; or a time interval pre-configured by the access network device.

Optionally, the predetermined time interval includes:

a maximum time interval between the transmission of direct data reported by the first terminal and the transmission of the direct HARQ feedback information corresponding to the direct data.

Optionally, the receiving module 910 is further configured to receive the predetermined time interval between the transmission of direct data reported by the first terminal and the transmission of the direct HARQ feedback information corresponding to the direct data; or to send downlink signaling to the first terminal, the downlink signaling being configured to indicate the predetermined time interval fed back the first terminal to the access network device, and to receive the predetermined time interval fed back by the first terminal.

It should be noted that, when the apparatus provided in the above embodiments realizes its functions, division of the above-mentioned functional modules is used as an example for illustration. In actual applications, the above-mentioned functions may be allocated to complete by different functional modules according to actual requirements. That is, a content structure of the device is divided into different functional modules to complete all or part of the functions described above.

With regard to the apparatus in the above embodiments, the specific way in which each module performs the operation has been described in detail in embodiments of the method and will not be elaborated here.

The foregoing mainly introduces the solution provided by the embodiments of the present disclosure from a view of interactions between the access network device, the first terminal, and the second terminal. It may be understood that, in order to implement the foregoing functions, devices (including the access network device, the first terminal, and the second terminal) include a hardware structure and/or a software module for performing each function. In combination with units and algorithm steps of the examples described in the embodiments disclosed in the present disclosure, the embodiments of the present disclosure may be implemented in a form of hardware or a combination of hardware and computer software. Whether a certain function is executed by the hardware or a manner of the computer software driving the hardware depends on specific applications and design constraint conditions of the technical solution. Those skilled in the art may use different methods for each specific application to implement the described functions, but such implementation should not be considered as going beyond the scope of the technical solution of the embodiments of the present disclosure.

Figure 10:
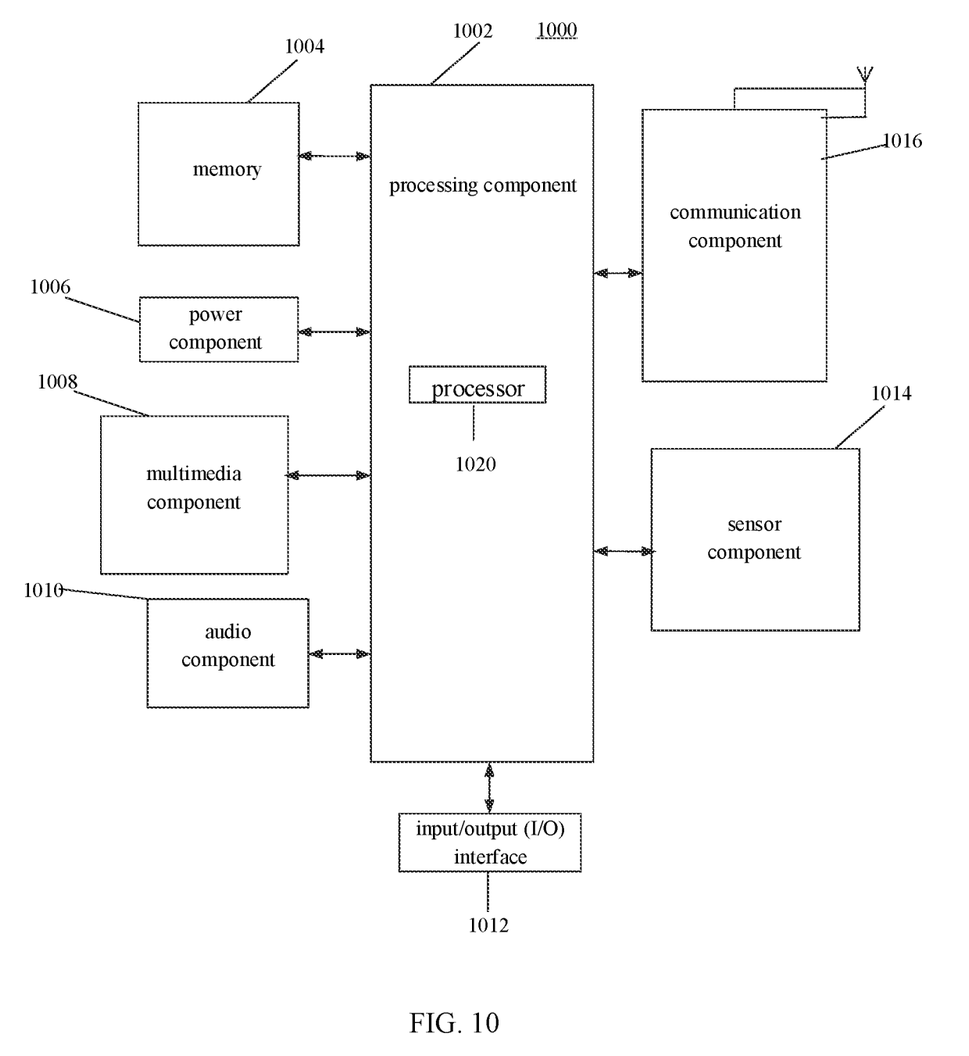
FIG. 10 is a block diagram illustrating a terminal according to an exemplary embodiment.

FIG. 10 is a block diagram illustrating a terminal 1000 according to an example embodiment. For example, a terminal 1300 may be a mobile phone, a computer, a digital broadcasting terminal, a messaging device, a game console, a tablet device, a medical equipment, a fitness equipment, a personal digital assistant, etc.

As illustrated in FIG. 10, the terminal 1000 may include one or more components: a processing component 1002, a memory 1004, a power supply component 1006, a multimedia component 1008, an audio component 1010, an input/output (I/O) interface 1013, a sensor component 1014, and a communication component 1016.

The processing component 1002 generally controls the whole operation of the terminal 1000, such as the operations related to display, phone call, data communication, camera operation and recording operation. The processing component 1002 may include one or more processors 1020 to execute instructions, to complete all or part of blocks of the above methods. In addition, the processing component 1002 may include one or more modules for the convenience of interaction between the processing component 1002 and other components. For example, the processing component 1002 may include a multimedia module for the convenience of interaction between the multimedia component 1008 and the processing component 1002.

The memory 1004 is configured to store all types of data to support the operation of the terminal 1000. Examples of the data include the instructions of any applications or methods operated on terminal 1000, contact data, phone book data, messages, pictures, videos, etc. The memory 1004 may be implemented by any type of volatile or non-volatile storage devices or their combination, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a Magnetic Memory, a Flash Memory, a Magnetic Disk or an Optical Disk.

The power supply component 1006 may provide power supply for all components of the terminal 1000. The power supply component 1006 may include a power supply management system, one or more power supplies, and other components related to generating, managing and distributing power for the terminal 1000.

The multimedia component 1008 includes an output interface screen provided between the terminal 1000 and the user. In some embodiments, a screen may include a liquid crystal display (LCD) and a touch panel (TP). If the screen includes a touch panel, the screen may be implemented as a touch screen to receive input signals from the user. The touch panel includes one or more touch sensors to sense touching, sliding and gestures on the touch panel. The touch sensor may not only sense the boundary of touching or sliding action, but also detect the duration and pressure related to the touching or sliding operation. In some embodiments, the multimedia component 1008 includes a front camera and/or a rear camera. When the terminal 1000 is in operation mode, such as shooting mode or video mode, the front camera or the rear camera may receive the external multimedia data. Each front camera and rear camera may be a fixed optical lens system or an optical lens system with focal length and optical zoom capacity.

The audio component 1010 is configured as an output and/or input signal. For example, the audio component 1010 includes a microphone (MIC). When the terminal 1000 is in operation mode, such as call mode, record mode, and speech recognition mode, the microphone is configured to receive external audio signals. The audio signals received may be further stored in the memory 1004 or sent via the communication component 1016. In some embodiments, the audio component 1010 further includes a speaker configured to an output audio signal.

An I/O interface 1013 provides an interface for the processing component 1002 and the peripheral interface module, in which the peripheral interface module may be a keyboard, click wheel, a button, etc. The buttons may include but not limited to a home button, a volume button, a start button and a lock button.

The sensor component 1014 includes one or more sensors, configured to provide various aspects of status assessment for the terminal 1000. For example, the sensor component 1014 may detect the on/off state of the terminal 1000 and the relative positioning of the component. For example, the component is a display and a keypad of the terminal 1000. The sensor component 1014 may further detect the location change of the terminal 1000 or one component of the terminal 1000, the presence or absence of contact between the user and the terminal 1000, the orientation or acceleration/deceleration of the terminal 1000, and the temperature change of the terminal 1000. The sensor component 1014 may include a proximity sensor, which is configured to detect the existence of the objects nearby without any physical contact. The sensor component 1014 may further include a light sensor such as a CMOS or CCD image sensor, which is configured to use in imaging applications. In some embodiments, the sensor component 1014 may further include an acceleration transducer, a gyroscope sensor, a magnetic sensor, a pressure sensor or a temperature sensor.

The communication component 1016 is configured for the convenience of wire or wireless communication between the terminal 1000 and other devices. The terminal 1000 may access wireless networks based on communication standard, such as Wi-Fi, 2G or 3G, or their combination. In an exemplary embodiment, the communication component 1016 receives broadcast signals or broadcast-related information from an external broadcast management system via a broadcast channel. In an exemplary embodiment, the communication component 1016 further includes a near field communication (NFC) module to facilitate short-range communication.

In an exemplary embodiment, the terminal 1000 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors or other electronics components, which is configured to perform the above method.

In an exemplary embodiment, a non-temporary computer readable storage medium is further provided which includes instructions, such as the memory 1004 including instructions, in which the instructions may be executed by the processor 1020 of the terminal 1000 to complete the above methods. For example, the non-temporary computer readable storage medium may be a ROM, a random access memory (RAM), a CD-ROM, a magnetic tape, a floppy disk, an optical data storage device, etc.

The non-temporary computer readable storage medium is provided. When the instruction in the non-temporary computer readable storage medium is executed by the processor of the first terminal so that the first terminal may execute the above data transmission method.

Figure 11:
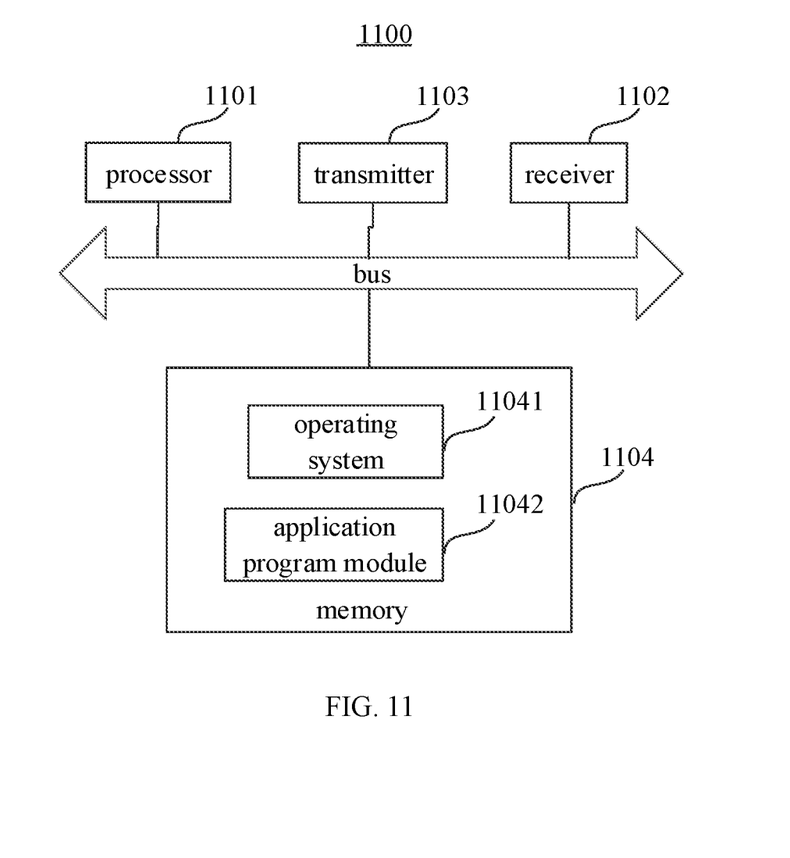
FIG. 11 is a block diagram illustrating an access network device according to an exemplary embodiment.

FIG. 11 is a block diagram illustrating an access network device 1100 according to an exemplary embodiment.

The access network device 1100 may include: a processor 1101, a receiver 1102, a transmitter 1103 and a memory 1104. The receiver 1102, the transmitter 1103 and the memory 1104 are respectively connected to the processor 1101 through a bus.

The processor 1101 includes one or more processing cores, and runs software programs and modules to execute the methods executed by the access network device in the transmission configuration method provided in the embodiments of the present disclosure. The memory 1104 may be configured to store the software programs and modules. In detail, the memory 1104 may store an operating system 11041 and an application program module 11042 required by at least one function. The receiver 1102 is configured to receive communication data sent by other devices, and the transmitter 1103 is configured to send communication data to other devices.

An exemplary embodiment of the present disclosure also provides a data transmission system for direct communication, which includes a terminal and an access network device.

The terminal is implemented by the data transmission apparatus for direct communication provided the embodiment as illustrated in FIG. 8.

The access network device is implemented by the data transmission apparatus for direct communication provided the embodiment as illustrated in FIG. 9.

An exemplary embodiment of the present disclosure also provides a data transmission system for direct communication, which includes a terminal and an access network device.

The terminal is implemented by the terminal provided the embodiment as illustrated in FIG. 10.

The access network device is implemented by the access network device provided the embodiment as illustrated in FIG. 11.

An exemplary embodiment of the present disclosure also provides a computer readable storage medium with at least one instruction, at least one program, a code set or an instruction set stored thereon. The least one instruction, the least one program, the code set or the instruction set is loaded or executed by a processor to implements steps executed by the first terminal or the access network device in the data transmission method for direct communication provided by the above respective method embodiments.

After considering the specification and practicing the disclosure herein, those skilled in the art will easily think of other embodiments of the present application. The present application is intended to cover any variations, usages, or adaptive changes of the present application. These variations, usages, or adaptive changes follow the general principles of the present application and include common knowledge or conventional technical means in the technical field not disclosed by the present application. The description and the embodiments are to be regarded as exemplary only, and the true scope and spirit of the present application are referred to the appended claims.

It should be understood that the present invention is not limited to the precise structure described above and shown in the drawings, and various modifications and changes may be made without departing from its scope. The scope of the claimed invention is only limited by the appended claims.

What is claimed is:

1. A data transmission method for direct communication, comprising:
when direct hybrid auto repeat request (HARQ) feedback information and uplink information are to be sent within a target time unit, and the direct HARQ feedback information and the uplink information satisfy a predetermined timing relationship, sending, by a first terminal, the direct HARQ feedback information and the uplink information to an access network device on the same physical layer uplink channel within the target time unit;
wherein, the direct HARQ feedback information is configured to indicate a receiving state corresponding to direct data, and the direct data is physical layer data sent by the first terminal to a second terminal through a direct link;
wherein the predetermined timing relationship comprises:
a first time point being prior to a second time point, and an absolute value of a difference between the first time point and the second time point being greater than a predetermined processing time length;
wherein, the first time point is an end transmission time point of the direct HARQ feedback information on a direct feedback channel, and the second time point is a start transmission time point of the uplink information on the physical layer uplink channel.

2. The method according to claim 1, wherein the uplink information comprises at least one of scheduling request SR, feedback response information ACK/NACK, channel state information CSI, channel quality indicator CQI, and uplink service data.

3. The method according to claim 1, wherein the predetermined processing time length comprises:
a first fixed constant; or
a time length predefined by a communication protocol; or,
a time length pre-configured by the access network device.

4. The method of claim 1, further comprising:
receiving downlink control information DCI sent by the access network device and configured for scheduling transmission of the direct data, wherein the DCI is configured to indicate a start transmission time point of the direct HARQ feedback information, and the start transmission time point of the direct HARQ feedback information is a time point when the second terminal starts to send the direct HARQ feedback information to the first terminal;
obtaining a predetermined transmission time length of the direct HARQ feedback information; and
determining the first time point according to the start transmission time point of the direct HARQ feedback information and the predetermined transmission time length.

5. The method according to claim 1, further comprising:
receiving downlink control information DCI sent by the access network device and configured for scheduling transmission of the direct data, wherein the DCI is configured to indicate an end transmission time point of the direct data, and the end transmission time point of the direct data is a time point when the second terminal receives the direct data sent by the first terminal;
obtaining a predetermined time interval between the transmission of the direct data and transmission of the direct HARQ feedback information corresponding to the direct data; and
determining the first time point according to the end transmission time point of the direct data and the predetermined time interval.

6. The method according to claim 5, wherein the predetermined time interval comprises:
a second fixed constant; or
a time interval predefined by a communication protocol; or
a time interval pre-configured by the access network device.

7. The method of claim 5, wherein the predetermined time interval comprises:
a maximum time interval between the transmission of direct data reported by the first terminal and the transmission of the direct HARQ feedback information corresponding to the direct data.

8. The method according to claim 5, further comprising:
reporting, by the first terminal, the predetermined time interval to the access network device; or
receiving, by the first terminal, downlink signaling sent by the access network device, and feeding the predetermined time interval back the access network device according to the downlink signaling.

9. A data transmission method for direct communication, comprising:
when direct hybrid auto repeat request (HARQ) feedback information and uplink information sent by the first terminal are to be received within a target time unit, and the direct HARQ feedback information and the uplink information satisfy a predetermined timing relationship, receiving, by an access network device, the direct HARQ feedback information and the uplink information sent by the first terminal on the same physical layer uplink channel within the target time unit;
wherein, the direct HARQ feedback information is configured to indicate a receiving state corresponding to direct data, and the direct data is physical layer data sent by the first terminal to a second terminal through a direct link;
wherein the predetermined timing relationship comprises:
a first time point being prior to a second time point, and an absolute value of a difference between the first time point and the second time point being greater than a predetermined processing time length;
wherein, the first time point is an end transmission time point of the direct HARQ feedback information on a direct feedback channel, and the second time point is a start transmission time point of the uplink information on the physical layer uplink channel.

10. The method according to claim 9, wherein the uplink information comprises at least one of scheduling request SR, feedback response information ACK/NACK, channel state information CSI, channel quality indicator CQI, and uplink service data.

11. The method according to claim 9, wherein the predetermined processing time length comprises:
a first fixed constant; or
a time length predefined by a communication protocol; or,
a time length pre-configured by the access network device.

12. The method of claim 9, further comprising:
sending downlink control information DCI for scheduling transmission of the direct data to the first terminal, wherein the DCI is configured to indicate a start transmission time point of the direct HARQ feedback information, and the start transmission time point of the direct HARQ feedback information is a time point when the second terminal starts to send the direct HARQ feedback information to the first terminal;

obtaining a predetermined transmission time length of the direct HARQ feedback information; and determining the first time point according to the start transmission time point of the direct HARQ feedback information and the predetermined transmission time length.

13. The method according to claim 9, further comprising:
sending, by the access network device, downlink control information DCI for scheduling transmission of the direct data to the first terminal, wherein the DCI is configured to indicate an end transmission time point of the direct data, and the end transmission time point of the direct data is a time point when the second terminal receives the direct data sent by the first terminal;

obtaining a predetermined time interval between the transmission of the direct data and transmission of the direct HARQ feedback information corresponding to the direct data; and determining the first time point according to the end transmission time point of the direct data and the predetermined time interval.

14. The method according to claim 13, wherein the predetermined time interval comprises:
a second fixed constant; or
a time interval predefined by a communication protocol; or
a time interval pre-configured by the access network device.

15. The method of claim 13, wherein the predetermined time interval comprises:
a maximum time interval between the transmission of direct data reported by the first terminal and the transmission of the direct HARQ feedback information corresponding to the direct data.

16. The method according to claim 13, further comprising:

receiving the predetermined time interval between the transmission of direct data reported by the first terminal and the transmission of the direct HARQ feedback information corresponding to the direct data; or sending downlink signaling to the first terminal, the downlink signaling being configured to indicate the predetermined time interval fed back the first terminal to the access network device, and receiving the predetermined time interval fed back by the first terminal.

17. A terminal, comprising:
a processor;
a transceiver coupled to the processor;
a memory configured to store instructions executable by the processor;
wherein the processor is configured to load and execute the executable instructions to implement a data transmission method for direct communication;
the processor is configured to:
when direct hybrid auto repeat request (HARQ) feedback information and uplink information are to be sent within a target time unit, and the direct HARQ feedback information and the uplink information satisfy a predetermined timing relationship, send, by a first terminal, the direct HARQ feedback information and the uplink information to an access network device on the same physical layer uplink channel within the target time unit;

wherein, the direct HARQ feedback information is configured to indicate a receiving state corresponding to direct data, and the direct data is physical layer data sent by the first terminal to a second terminal through a direct link;

wherein the predetermined timing relationship comprises:
a first time point being prior to a second time point, and an absolute value of a difference between the first time point and the second time point being greater than a predetermined processing time length;

wherein, the first time point is an end transmission time point of the direct HARQ feedback information on a direct feedback channel, and the second time point is a start transmission time point of the uplink information on the physical layer uplink channel.

* * * * *